Sept. 29, 1931.
D. TULCHIN
TURNSTILE
Re. 18,211
Original Filed June 5, 1924
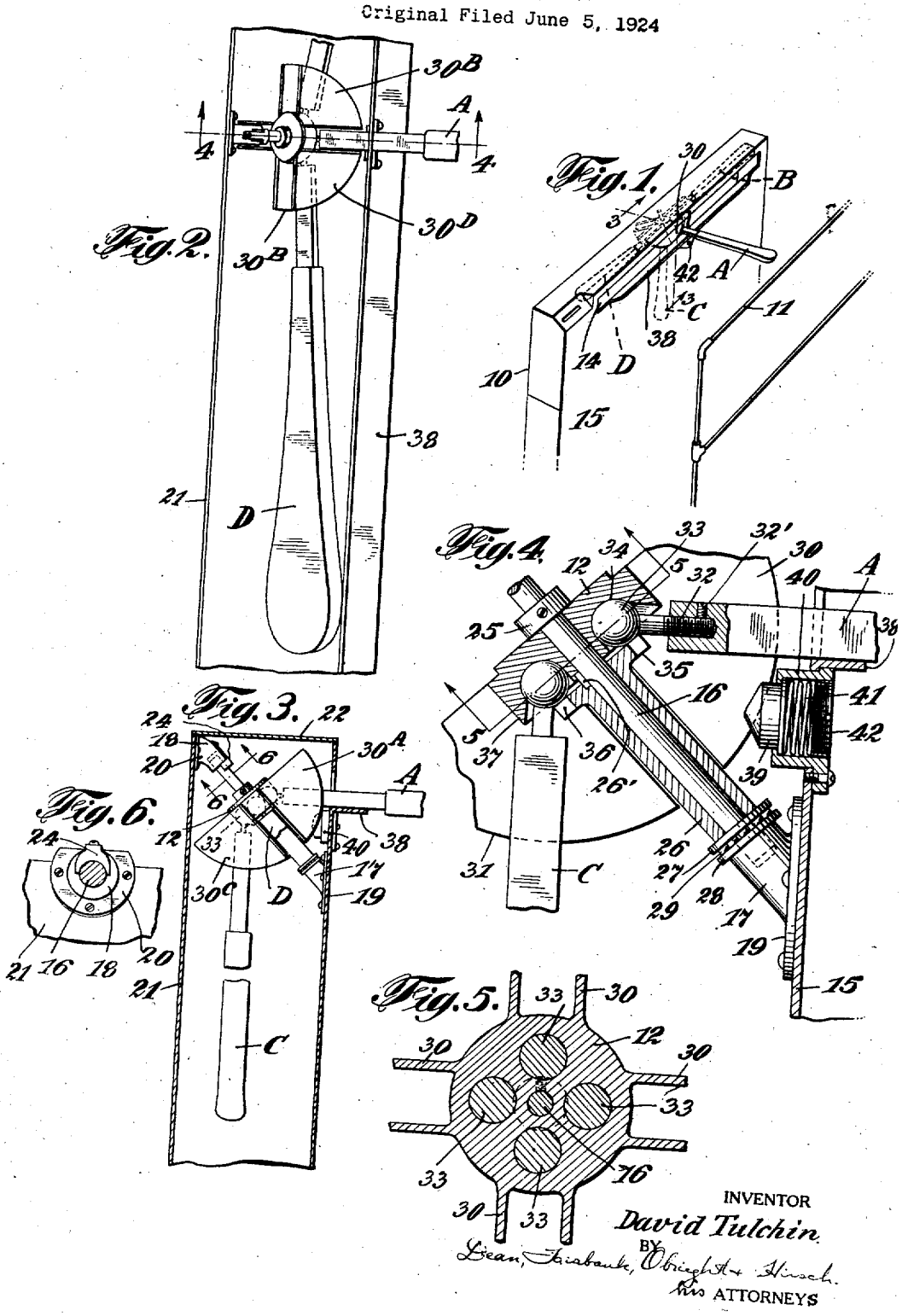
INVENTOR
David Tulchin
BY
Dean, Fairbanks, Obright & Hirsch.
his ATTORNEYS Reissued Sept. 29, 1931

Re. 18,211

UNITED STATES PATENT OFFICE

DAVID TULCHIN, OF NEW YORK, N. Y.

TURNSTILE

Original No. 1,726,779, dated September 3, 1929, Serial No. 717,965, filed June 5, 1924. Application for reissue filed July 24, 1931. Serial No. 552,957.

My present invention relates to turnstiles of the space-economizing type, in which the barrier arms pass out of the horizontal plane when out of passage-guarding position, and the turnstile projects from the supporting wall or post by the width of one arm at one side thereof, rather than by the width of an arm at both sides thereof.

An object of the invention is to provide a turnstile of the type mentioned which shall be of simple, rugged, yet inexpensive construction, unlikely to become deranged in operation, which in operation does not involve traverse of a barrier arm to the side of the support wall or post opposite the guarded passage, and which shall have a light or feather-weight action.

The invention is embodied in a construction comprising a support or hub having barrier arms protruding therefrom and mutually related to maintain a constant angular interval between the axial planes of the successive arms, in which planes, however, the arms when unsupported are free to drop.

In the preferred embodiment, the arm in passage-blocking relation, is maintained in a horizontal plane by an appropriate support or shelf, while the arms not in blocking relation drop by reason of their unsupported connection. Preferably guides are provided such that the arm about to enter into blocking relation is automatically maintained in operation of the turnstile in the horizontal plane in which it performs its blocking function.

In the specific construction preferred, the hub is rotatable mounted on an oblique axis, preferably at an angle of 45 degrees, in the vertical plane of the operative barrier arm, and said hub carries identical guide-ways one for each barrier arm. Each guide-way acts by a compound camming and lifting action to raise the corresponding barrier arm to the level in which it performs its blocking function, to transmit torque from the blocking arm in operating the turnstile and to guide the gravity descent of the arm after it has traversed the passage to be blocked.

In the preferred embodiment, in which four barrier arms are employed, the arm moving out of operative position increases the torque on the hub or head produced by a person passing through the turnstile, thereby assisting in rotating the head to lift the opposite arm into operative horizontal position.

In the accompanying drawings,

Fig. 1 is a perspective view of a passage-way guarded by my improved turnstile,

Fig. 2 is a top plan view of the turnstile,

Fig. 3 is a view in transverse section taken along the line 3—3 of Fig. 1,

Fig. 4 is an enlarged vertical sectional view through the turnstile head and its associated mechanism, Fig. 5 is a view in transverse section taken along the line 5—5 of Fig. 4, and Fig. 6 is an enlarged view in transverse section taken along the line 6—6 of Fig. 3.

I have illustratively shown a passage-way defined at one side by a hollow wall or housing 10 and at the other by a railing 11. The turnstile includes a rotatable head 12 within the housing 10, and a plurality of barrier arms, A, B, C and D carried by the head and movable into and out of passage obstructing position through a horizontal slot 14 in the wall 15 of the housing adjacent the passage-way. I prefer to use four arms so that the arms and head will be moved through an arc of 90 degrees, whenever a person passes through the stile, although less or more than four arms may be used, if desired.

The head 12 is mounted to rotate on an axis in the plane of the obstructing arm and at an angle of approximately 45 degrees to the horizontal. The head turns either with or upon a shaft 16, extending obliquely across and having bearings within the housing. The bearings for the ends of this shaft 16 may comprise socket members 17 and 18, respectively secured by flanges 19 and 20 against the inner face of the wall 15 below the slot 14 and the inner face of the rear wall 21 of the housing above the slot 14. For convenience in assembling the device, the top 22 of the housing is removable and the socket member 18 includes a removable bearing section 24, which is secured in position after the upper rear end of the shaft 16 is dropped into the socket 18.

The rotatable head 12 is arranged on the shaft 16 between a sleeve 26 and a fixed collar 25. An external flange 27 at the lower end of the sleeve 26 cooperates with a similar flange 28 on the socket member 17 to form a race for a set of ball or equivalent bearings 29.

The head preferably includes a circular block turning upon the shaft 16 keyed as at 26′ to sleeve 26 and carrying at angular intervals of a quadrant, sector guide-ways for the barrier arms. Each guide-way comprises a pair of radially extending quadrant sector plates 30, the reference numeral of the guide-way of each barrier arm having an exponent corresponding to the reference character of the arm. Each pair of plates provides a guide-way for the movement of the barrier arms in planes at right angles to the plane of rotation of the head. The guide-ways thus limit the arms to movement in planes axial of the head and mutually spaced by a quadrant.

Preferably the barrier arms have a universal connection with the head and are universally movable relative thereto, except in so far as the independent turning movement of the head and arms is limited by the plates 30. To effect this connection metallic mounting shanks 32 having knobbed or spherical heads 33 are screwed and pinned as at 32′ or otherwise rigidly secured to the inner ends of the arms, which latter may be of wood. The spherical heads are accommodated in sockets 34 in the underface of the head 12 and are retained therein by an annular flange 35 at the adjacent end of the sleeve 26. The sector plates 30 are cut-away as at 36 to receive flange 35. The hub and flange thus cooperate to provide a universal mounting for the spherical heads. The sockets 34 are widened at 37 toward the periphery of the head to permit the swinging movement of the arms.

The barrier arms may include wide flat free ends of conventional form or may be circular in cross-section, as shown. Preferably a lip or shelf 38 extends into the passageway at the bottom edge of the slot 14 to support the barrier arms during their movement across the passageway.

A spring-urged latch member such as the conical headed stud 39 may be used to check the swinging movement of the turnstile after a person has passed through, and prevent the barrier arms from swinging through an arc of more than 90 degrees under the influence of a single impetus. This stud may conveniently snap into place between the curved edges of a pair of the sector plates 30 and is mounted to slide in a guide sleeve 40 secured upon the wall 15 of the housing 10. A coiled spring 41 bearing against a disk 42 screwed into the sleeve 40, urges the stud into the path of the sector plates, which engage the head of the stud and force it back into the sleeve against the action of the spring 41 at each operation of the stile.

The turnstile is normally in the position shown, in which one of the arms designated by A projects horizontally across the passage barred, the arm B in advance thereof, unsupported by the ledge 38 has dropped by gravity along its guide-way $30^B$, limited, however, in its drop by the side 15 of the wall. The succeeding arm C associated with the flange or guide-way $30^C$ which at the time extends at right angles to the length of the wall has dropped by gravity to pendent or vertical position, as shown, while the arm D is in position generally analogous to arm B, part-way within its associated guide-way $30^D$, the free end of the arm D resting against the side 15 of the wall, at substantially the level of the ledge 38.

In operation, the person presses against the obstructing barrier arm A in the usual manner, the pressure against guide-way $30^A$ effecting rotation of the hub or head 12 about its axis 16. The barrier arm A remains in a horizontal position since it rests on the ledge 38, as long as it projects laterally of the wall 10, during which movement, the socket of the ball head 33 will turn relative thereto, to accommodate or permit the concurrent movement of the head or hub about its oblique axis. Throughout this movement, the rotating head moves with it the three arms B, C and D, the flanges 31, compelling said arms to move in planes axially of the hub, mutually spaced by angles of 90 degrees. In the movement of the arm A through a quadrant, it will be understood that the arm A assumes the position previously taken by arm B, arm B takes the position of arm C, arm C takes the position of arm D, and arm D will move to the position of arm A, the arms thus moving in a cyclic order, the spring latch 39 sharply arresting the turnstile after each quadrant of movement thereof. Specifically the guide-way 30 of the arm A extends in a generally vertical plane at the outset, but as the arm is moved forward, said guide assumes an inclination which increases until said inclination is approximately 45 degrees, as the end of the arm A moves past the flange 38, whereupon the arm being no longer supported will tend to drop by gravity along the inclined guide $30^A$, limited, however, by the side wall 15. In this action, as will be readily understood, the guide-way $30^B$ of the arm B has moved to a vertical plane, so that the arm B will drop freely by gravity to the position shown by arm C. In the rotation of the hub, the guide $30^C$ of arm C performs a combined camming and lifting action thereon, raising the latter, the free end of which moves along the wall 15 to substantially the level of the ledge 38, as shown. The arm D has moved in the operation, out of slot 14 and thence horizontally along ledge 38 to the position of arm A.

As arm A moves past ledge 38, the weight thereof dropping obliquely along guide 30A when no longer supported by the ledge, acts directly to create or increase the torque on the rotatable head. Through a great part of the movement of the arm from position D to position A, this torque on the head will continue, assisting in the lifting section of the opposite arm from position D to the level of ledge 38. This feature contributes largely to the featherweight operation of the stile.

Since the arms at positions B and D effect equal and opposite torque on the head, they are substantially balanced and the only additional torque necessary other than to overcome the small frictional losses incurred in rotating the stile is that which is required for lifting the free end of the arm D for a few inches to the level of ledge 38. This lifting is relatively easy inasmuch as the combined camming action above described and the free axial turning movement of the barrier arm permit the lifting to be accomplished with little effort and no binding.

Even without the latch member 39 the turnstile when in the position shown in the drawings, is in a state of equilibrium, the arms in the positions B and D of Fig. 1, exerting opposite torque on the head and balancing each other and the arms in the positions A and C having no turning effect on the head.

If one of the arms should have a tendency to stick in its guide-way between the sector plates, it cannot jam the turnstile, since when the free end of the barrier arm strikes against the rear wall 21 of the housing, this wall and the edge of the follower plate 30 will function in reverse direction to effect positive depression of the arm and movement of the same to position A.

A turnstile of the type above described may be readily adapted for turning movement only in one direction or it may be adapted for coin-controlled operation in one direction and free turning in the other direction. The application of coin-controlled mechanism, registering mechanism and similar conventional attachments is apparent, and being no part of the present invention is not described.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:—

1. In apparatus of the character described, in combination, a supporting wall, a turnstile structure comprising a head carrying four arms having a common axis, means maintaining a constant angle of a quadrant between the axial planes of successive arms, said arms mounted for hinging movement, each in its axial plane, and a guide construction having identical parts rotating with the various arms, the guide associated with the blocking arm directing said arm downwardly after the latter has been moved from obstructing relationship and the guide associated with the succeeding arm directing the latter upward toward the level which arm occupies in blocking relation.

2. The combination set forth in claim 1 in which the guides are mounted in a unitary structure rotating with the head and in which the torque thereon is transmitted through the guide associated with the arm moved from blocking position.

3. In a turnstile, in combination, a head rotatable in a plane at an angle to the horizontal, barrier arms carried by the head and free to swing in a downward direction relative thereto, means limiting said arms to movement in a substantially horizontal plane across a passage guarded by the turnstile, said head having means carried thereby to advance along the substantially horizontal plane the arm entering the passage to be guarded.

4. In a turnstile, a rotating head, barrier arms carried by the head, means for supporting the arm that guards the passage in a horizontal position for approximately 180 degrees of its movement, and means carried by the head for urging the succeeding arm substantially horizontal to passage guarding position, by force transmitted in pushing the passage guarding arm past the supporting means.

5. In a turnstile, a rotating head, barrier arms carried by the head, means for supporting the arms in a horizontal position for approximately 180 degrees of their movement, and means rigid with the head for lifting the arms into horizontal position.

6. A turnstile element including a head and a plurality of barrier arms associated with the head by a universal connection, and means limiting said arms to movement in planes axial of said head and separated by a quadrant.

7. A turnstile including an oblique head and a plurality of barrier arms associated with the head by a universal connection, said head including means for controlling the inclinations of the barrier arms, and means for maintaining in horizontal position the arm in obstructing relation.

8. A turnstile including a head rotating in a plane at an angle to the horizontal, and a plurality of barrier arms associated with the head by a universal connection, said head including means for maintaining the barrier arms in planes at uniform angular intervals and for raising and lowering the arms into and out of horizontal passage blocking position.

9. In combination, a housing having a slot in one wall thereof, a turnstile including a head rotatable within the housing in a plane at approximately an angle of 45 degrees to the vertical walls of the housing, a plurality of barrier arms carried by the head, and means whereby rotation of the head effects movement of said arms through the slot beyond the housing during approximately a half revolution of the head.

10. In combination, a housing having a horizontal slot in one wall thereof, a turnstile including a head rotatable within the housing in a plane at approximately an angle of 45 degrees to the vertical walls of the housing, a plurality of barrier arms carried by the head and movable in axial planes of said head, and means whereby rotation of the head effects movement of said arms through said slot, said means including lifting cams moving with the head for raising an arm to the level of the horizontal slot preparatory to its passage to obstructing relation.

11. In combination, a hollow passage wall, a turnstile including a head housed within said wall and rotating in a plane at an angle of approximately 45 degrees to the vertical plane of the wall, a plurality of barrier arms associated with the head, said wall having a slot in one side thereof through which the arms are movable during approximately a half revolution of the head.

12. In combination, a hollow passage wall, a turnstile including a head housed within said wall and rotating in a plane at an angle of approximately 45 degrees to the vertical plane of the wall, a plurality of barrier arms associated with the head by a universal connection and restrained in equidistant axial planes of the head, said wall having a slot in one side thereof through which the arms are movable during approximately a half revolution of the head, said head including pairs of sectoral guide plates guiding the movement of the arms in a plane at right angles to the plane of rotation of the head.

13. In combination, a hollow passage wall, a turnstile including a head housed within said wall and rotating in a plane at an angle of approximately 45 degrees to the vertical plane of the wall, a plurality of barrier arms associated with the head by a universal connection, said wall having a slot in one side thereof through which the arms are movable during approximately a half revolution of the head, said head including pairs of sectoral guide plates guiding the movement of the arms in a plane at right angles to the plane of rotation of the head, the edges of said sector plates cooperating with a wall of the housing to effect a compound camming and lifting action on the arms to move them into position to pass through the slot.

14. A turnstile including a shaft disposed at an angle of approximately 45 degrees to the vertical, a head rotating on the shaft and a plurality of barrier arms associated with the head by a universal connection.

15. A turnstile including a shaft disposed at an angle of approximately 45 degrees to the vertical, a head rotating on the shaft and a plurailty of barrier arms associated with the head, said head by a universal connection including pairs of sector plates guiding the movement of the arms in planes at right angles to the plane of rotation of the head.

16. A turnstile including a shaft disposed at an angle of approximately 45 degrees to the vertical, a head rotating on the shaft and a plurality of barrier arms associated with the head, said head by a universal connection including pairs of sector plates guiding the movement of the arms in planes at right angles to the plane of rotation of the head, a stationary member associated with the turnstile and adapted to be engaged by the free ends of the arms and to cooperate with the curved edges of the guide plates to effect shifting of said arms in planes at right angles to the plane of rotation of the head.

17. The combination with a vertical housing having a horizontal slot in one side wall thereof, of a turnstile including a head of approximately the same width as the housing and mounted to rotate in a plane at an angle of approximately 45 degrees to the vertical and about a center in approximately the same horizontal plane as the slot, and barrier arms associated with the head by a universal connection and movable through the slot.

18. The combination with a vertical housing having a horizontal slot in one side wall thereof, of a turnstile including a head of approximately the same width as the housing, mounted to rotate in a plane at an angle of approximately 45 degrees to the vertical and about a center in approximately the same horizontal plane as the slot, barrier arms associated with the head by a universal connection and movable through the slot, and means carried by the head for guiding the movement of the barrier arms in planes at right angles to the plane of rotation of the head.

19. The combination with a vertical housing, having a horizontal slot in one side wall thereof, of a turnstile including a head of approximately the same width as the housing, mounted to rotate in a plane at an angle of approximately 45 degrees to the vertical and about a center in approximately the same horizontal plane as the slot, barrier arms associated with the head by a universal connection and movable through the slot, means carried by the head for guiding the movement of the barrier arms in planes at right angles to the plane of rotation of the head, said means comprising guide plates having arcuate edges cooperating with the wall of the housing to effect a compound lifting action of the arms into position to pass through the slot.

20. A turnstile including a head mounted to rotate in a plane at approximately 45 degrees to the horizontal, said head including four pairs of equidistantly spaced sectoral guide plates, barrier arms associated with the head by a universal connection and guided for movement at right angles to the head by said guide plates, and a horizontal stationary shelf supporting the arms during a portion of their revolution with the head.

21. A turnstile including a head mounted to rotate in a plane at approximately 45 degrees to the horizontal, said head including four pairs of equidistantly spaced sectoral guide plates, barrier arms associated with the head by a universal connection and guided for movement at right angles to the head by said guide plates, a stationary shelf across which the arms are movable during a portion of their revolution with the head, and means whereby the turning guide plates lift the arms into position to the level of said shelf.

22. A turnstile including a head mounted to rotate in a plane at approximately 45 degrees to the horizontal, said head including four pairs of equidistantly spaced sectoral guide plates, barrier arms associated with the head by a universal connection and guided for movement at right angles to the head by said guide plates, a stationary shelf on which the arms are supported during a portion of their revolution with the head, means for lifting the arms into position for movement across the shelf, said head being disposed at such an angle to the shelf that a barrier arm falling from the shelf will exert a positive torque on the head tending to lift a diametrically opposite barrier arm to the level of the shelf.

23. In a turnstile, in combination, an inclined rotatable turnstile head, barrier arms carried thereby, means maintaining said arms in a horizontal plane while crossing the passage guarded by the turnstile, said arms being mounted at said head to permit sufficient relative rotary movement about the arm axis to permit movement of the arm in a horizontal plane simultaneous with movement of the head about its oblique axis.

24. A turnstile including a head, barrier arms extending outward from and to one side of the face of said head, means retaining said barrier arms in planes that include the axis of said head and with equal angular intervals between them, and an oblique pivot axis supporting said head at a fixed angle such as to dispose one of the arms in passage guarding position.

25. In a turnstile a head, an oblique pivot mount therefor, barrier arms extending outward from said head each at an angle with respect to and in a plane common to said pivot axis, the axial planes of said arms being at equal angular intervals, the angle of inclination of said pivot axis being at least as great as the acute angle of inclination of the barrier arms with respect thereto.

26. A turnstile as claimed in claim 25 in which the angle of inclination of the pivot axis is forty-five degrees.

27. A turnstile including a head, an oblique pivot axis therefor, barrier arms extending outward from said head each disposed at an acute angle with respect to said pivot mount, all said arms disposed toward one side of the plane of said head, means maintaining said arms in planes at equal angular intervals with respect to each other, said head including means for advancing each arm to passage guarding position as the preceding arm is pushed out of passage guarding position.

Signed at New York, in the county of New York and State of New York, this 22nd day of July, A. D. 1931.

DAVID TULCHIN.